United States Patent [19]

Ohta et al.

[11] Patent Number: 4,818,648
[45] Date of Patent: Apr. 4, 1989

[54] OPTICAL MEMORY ELEMENT

[75] Inventors: Kenji Ohta, Nara; Akira Takahashi; Tetsuya Inui, both of Nara; Hiroyuki Katayama, Ikoma; Junji Hirokane, Tenri; Yoshiteru Murakami, Nishinomiya, all of Japan

[73] Assignee: Sharp Kabushiki Kaisha, Osaka, Japan

[21] Appl. No.: 934,718

[22] Filed: Nov. 25, 1986

[30] Foreign Application Priority Data

Nov. 27, 1985 [JP] Japan .................................. 60-270361

[51] Int. Cl.⁴ .......................... G03C 5/16; G01D 9/00; G11B 3/70
[52] U.S. Cl. ...................................... 430/17; 430/321; 430/323; 430/325; 430/272; 156/643; 156/659.1; 156/663; 428/167; 428/156; 501/66; 501/52; 501/61; 501/62; 346/135.1; 346/134; 369/279
[58] Field of Search ................. 430/321, 323, 325, 17, 430/272; 156/643, 659.1, 663; 428/167, 156; 501/66, 52, 61, 62; 346/135.1, 134; 369/279

[56] References Cited

U.S. PATENT DOCUMENTS

| 4,015,045 | 3/1977 | Rinehart | 428/410 |
| 4,544,443 | 10/1985 | Ohta | 156/643 |
| 4,655,876 | 4/1987 | Kawai et al. | 156/659.1 |

FOREIGN PATENT DOCUMENTS

| 1287764 | 9/1965 | Fed. Rep. of Germany . | |
| 1596782 | 3/1967 | Fed. Rep. of Germany . | |
| 0122748 | 7/1985 | Japan | 501/66 |
| 1089066 | 2/1985 | U.S.S.R. . | |

Primary Examiner—Paul R. Michl
Assistant Examiner—Cynthia Hamilton
Attorney, Agent, or Firm—Irell & Manella

[57] ABSTRACT

An optical memory element comprising a substrate with grooves functioning as grooves for, for example, controlling the position of a laser beam, wherein said substrate is composed of a glass containing $SiO_2$ in the range of 51 to 71% by weight, $Na_2O$ in the range of 10 to 18% by weight, $K_2O$ in the range of 0 to 8% by weight, $Al_2O_3$ in the range of 12 to 22% by weight, and $B_2O_3$ in the range of 0 to 9% by weight.

6 Claims, 2 Drawing Sheets

1

OPTICAL MEMORY ELEMENT

BACKGROUND OF THE INVENTION

1. Field of the Invention

This invention relates to an optical memory element which optically records information therein.

2. Description of the Prior Art

In recent years, an optical memory system has been developed, which optically stores information in high density and in a mass storage order. The optical memory system ensures high density and mass storage because the information recording unit (bit) is determined by the diameter of the beam which is used in the recording operation and the reading operation. Generally, the bit size is selected to be about 1 μm. However, in order to have the optical memory system ensure high density and mass storage, the optical beam position must be accurately controlled so that the information is recorded at a predetermined position and the information is read out from a preselected position. With the optical memory system of a read only type, in general, address information can be recorded on the optical memory element when data information is recorded on the optical memory element. Accordingly, the optical beam position is controllable while the data information is read out from the optical memory element. However, in the optical memory system of an add-on-memory type or an erasable memory type, it is difficult to record the address information on the optical memory element while the data information is recorded on the optical memory element. Therefore, in the add-on-optical memory or the erasable optical memory, guide signals or guide addresses are normally recorded on the optical memory element, which are used to control the optical beam position.

FIG. 3 schematically shows the conventional optical memory element of an add-on-memory type (e.g., a DRAW type disc using TeOx, etc., as a recording material) or an erasable memory type (e.g., an optically magnetic disc using an alloy including rare earth elements and transition metals as a recording material), in which striped grooves are formed on the substrate of the optical memory element. The information recording operation and the information playback operation are conducted along the striped grooves. Some methods, typically three kinds of methods, for the formation of the striped grooves on the substrate of an optical memory element have been proposed as follows:

(1) A method for the formation of the abovementioned grooves on the substrate, in which a mold having striped grooves is employed to transcribe the striped grooves onto a resin substrate made of acrylic resin or polycarbonate resin by an injection molding technique.

(2) A method for the formation of the abovementioned grooves on the substrate, in which a mold having striped grooves is employed to transcribe the striped grooves onto a resin substrate made of acrylic resin or polycarbonate resin by a casting technique.

(3) A method for the formation of the above-mentioned striped grooves on the substrate, in which UV-setting resin is interposed between the stamper having striped grooves therein and the substrate made of acrylic resin, epoxy resin, glass, etc., and the interposed resin is then exposed to UV rays through the substrate so as to be cured, followed by removing the stamper. This method is known as "the 2P method".

Since all of the three methods use a resin layer, there is a possibility that oxygen or moisture will reach the recording material through the resin layer, which will cause deterioration of the recording material disposed on the substrate. That is, the conventional method does not ensure stable operation of the optical memory element. Especially, in optically magnetic memory elements in which a rare earth metal-transition metal alloy film made of GdTbFe, TbFeCo or the like is used as a recording material, it is undesirable to employ the above-mentioned resin layer for the substrate since the rare earth metals such as Gd, Tb, etc., are extremely active elements.

In order to eliminate the above-mentioned problems, the inventors of this patent application have proposed a method for the formation of striped grooves on a glass substrate by U.S. Pat. No. 4,544,443, in which a photo-resist material is coated on the glass substrate to form a photo-resist film; UV rays are applied to the photo-resist film through a photo-mask to form a guide groove pattern latent image on the photo-resist film; the said guide groove pattern latent image is developed; and then an etching operation is conducted through the said developed guide groove pattern so as to form the guide grooves in the glass substrate. However, the smoothness of the surface of the glass substrate is significantly damaged by the etching operation, which causes an increase in noise.

SUMMARY OF THE INVENTION

The optical memory element of this invention, which overcomes the above-discussed and numerous other disadvantages and deficiencies of the prior art, comprises a substrate with grooves functioning as grooves for, for example, controlling the position of a laser beam, wherein said substrate is composed of a glass containing $SiO_2$ in the range of 51 to 71% by weight, $Na_2O$ in the range of 10 to 18% by weight, $K_2O$ in the range of 0 to 8% by weight, $Al_2O_3$ in the range of 12 to 22% by weight, and $B_2O_3$ in the range of 0 to 9% by weight.

In a preferred embodiment, the grooves are formed by disposing a photo-resist film on said glass substrate; disposing a masking board, on which groove information is patterned, on said photo-resist film; applying light to said masking board to form a guide groove pattern latent image on said photo-resist film; developing said guide groove pattern latent image formed on said photo-resist film to form the grooves in the photo-resist film; subjecting said glass substrate covered with said photo-resist film containing the grooves to an etching treatment to form the grooves in said glass substrate; and removing said photo-resist film from said glass substrate.

In a preferred embodiment, the etching treatment is conducted by either a dry etching technique or a wet etching technique.

Thus, the invention described herein makes possible the object of providing an optical memory element comprising a substrate made of a novel glass, the surface smoothness of which is maintained at the same level as prior to an etching treatment, even though the glass substrate has been subjected to the etching treatment so as to form striped grooves therein, so that noise arising when the information is read out from the optical memory element can be reduced.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

FIGS. 1(a) to 1(e) show schematic diagrams illustrating a process for the production of the substrate of an optical memory element of this invention.

Figure 1A:
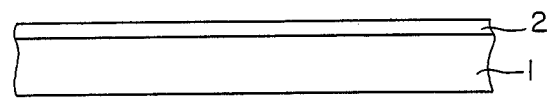
FIGS. 1(a) to 1(e) are schematic diagrams showing a process for the production of an optical memory element of this invention.

Step(1): A glass substrate having the surface polished with high accuracy is washed as a glass substrate of the optical memory element, and then, as shown in FIG. 1(a), a photo-resist material is coated on the glass substrate 1 by a spinner to form a photoresist film 2. The glass substrate 1 is composed of a glass containing $SiO_2$ in the range of 51 to 71% by weight, $Na_2O$ in the range of 10 to 18% by weight, $K_2O$ in the range of 0 to 8% by weight, $Al_2O_3$ in the range of 12 to 22% by weight, and $B_2O_3$ in the range of 0 to 9% by weight.

Figure 1B:
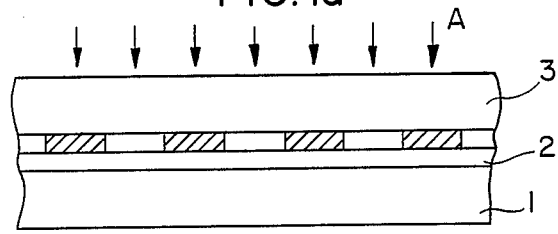

Step(2): As shown in FIG. 1(b), a masking board 3, on which guide groove information is patterned, is disposed on the glass substrate 1 covered by the photo-resist film 2, and the UV rays A are applied to the masking board 3 to form the guide groove pattern latent image on the photo-resist film 2.

Figure 1C:
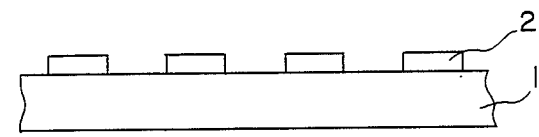

Step(3): The photo-resist film 2, which has a guide groove pattern latent image thereon corresponding to the guide groove pattern of the masking board 3, is subjected to a developing treatment to form the guide grooves in the photo-resist film 2 as shown in FIG. 1(c).

Figure 1D:
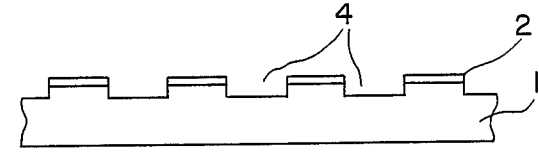
Figure 1E:
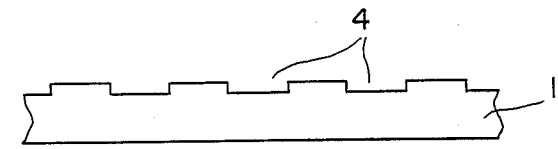

Step(4): The glass substrate 1 coated with the photo-resist film 2 having the guide grooves is subjected to a dry etching treatment such as a sputtering treatment (a reactive etching treatment) or the like within an etching gas such as $CF_4$, $CHF_3$ or the like, resulting in striped grooves 4 in the glass substrate 1 as shown in FIG. 1(d).

Step(5): The photo-resist film 2 is removed from the glass substrate 1 by use of a solvent such as acetone, etc., or by means of the sputtering method, etc., in an $O_2$ atmosphere. Thus, the striped grooves 4 which function as guide grooves or the like of a laser beam are formed in the glass substrate 1 as shown in FIG. 1 (e).

Figure 2A:
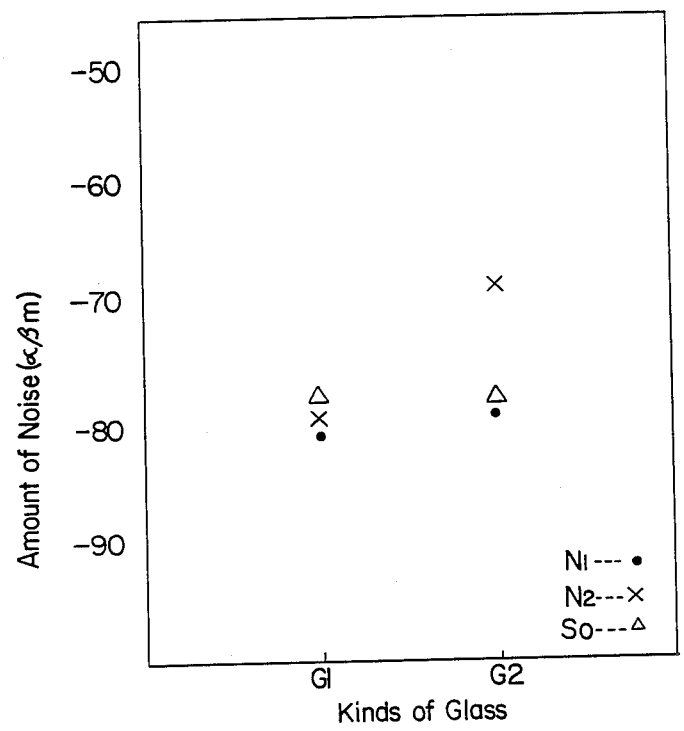
FIG. 2(a) shows a graph illustrating the relationship between the glass substrates and the amount of noise arising when information is read out from the optical memory element using each of the said glass substrates.

FIG. 2(a) shows the relationship between the glass substrates and the amount of noise, wherein "G1" is the characteristics of the novel glass, which is used for the substrate of this invention, with a composition containing $SiO_2$ of 61% by weight, $Na_2O$ of 13% by weight, $K_2O$ of 3% by weight, $Al_2O_3$ of 17% by weight, $B_2O_3$ of 4% by weight, and the others of 2% by weight, and "G2" is the characteristics of a glass (i.e., a soda-lime glass), which is used for a conventional substrate, with a composition containing $SiO_2$ of 72% by weight, $Na_2O$ of 15% by weight, $Al_2O_3$ of 2% by weight, CaO of 7% by weight, and MgO of 4% by weight.

Figure 2B:
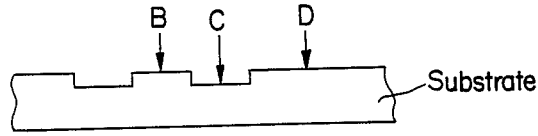
FIG. 2(b) is a front view showing a part of the glass substrate, wherein B, C, and D are the positions to each of which a laser beam is applied.
Figure 3:
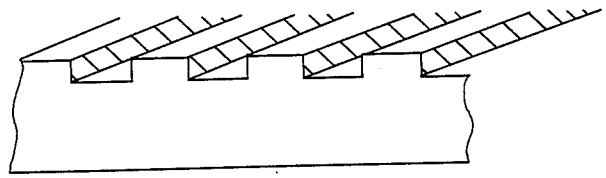
FIG. 3 is a perspective view showing a part of the glass substrate of the optical memory element of this invention.

The amount of noise shown in FIG. 2(a) is determined as follows: As shown in FIG. 2(b), noise arising at the position D of the glass substrate, at which no groove is formed, is regenerated by an optical head, and the frequency of the noise is analyzed by a spectrum analyzer to obtain the amount of noise, $S_0$. In the same manner as mentioned above, the amount of noise, $S_1$, at the position B of the glass substrate located between the grooves and the amount of noise, $S_2$, at the position C located in the groove of the glass substrate are obtained. Then, the difference $N_1$ in the amount of noise between the positions B and D and the difference $N_2$ in the amount of noise between the positions C and D are calculated using the values $S_0$, $S_1$ and $S_2$. The values $S_0$, $N_1$ and $N_2$ are plotted as shown in FIG. 2(a), which indicates that the amount of noise at the position C in the groove of the conventional glass substrate made of the ordinary G2 type glass is greater by $-70$ dBm than that at the position D of the same glass substrate made of the ordinary G2 type glass, whereas the amount of noise at the position C in the groove of the glass substrate made of the novel G1 type glass of this invention is greater by $-80$ dBm than that at the position D of the same glass substrate made of the novel G1 type glass of this invention. The amount of noise at each of the positions D and B of the glass substrate made of the novel G1 type glass of this invention is nearly equal to that at each of the positions D and B of the conventional glass substrate made of the ordinary G2 type glass, and accordingly it can be seen that the polished state of the G1 type glass of this invention prior to the etching treatment is the same as that of the conventional G2 type glass prior to the etching treatment.

The difference in the amount of noise between the G1 type glass and the G2 type glass caused by the formation of grooves in the glass substrates by an etching technique, is due to the difference in the composition between the G1 type glass and the G2 type glass. That is, the glass substrate made of the G1 type glass of this invention contains a relatively large amount of $Al_2O_3$ so that even though it is subjected to an etching treatment, the surface smoothness of the glass substrate can be maintained at the same level as before etching. On the contrary, the conventional glass substrate made of the G2 type glass, which is used for a conventional optical memory element, contains a small amount of $Al_2O_3$, so that once it is subjected to an etching treatment, the surface smoothness of the glass substrate is significantly damaged, which causes an increase in noise.

Although the above-mentioned example disclosed the formation of grooves by a dry etching technique such as a reactive ion etching technique, a wet etching technique can be, of course, applied to the glass of this invention to thereby produce a high quality glass substrate which is useful for an optical memory element.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. In an optical memory element comprising a substrate with grooves from which signals are read out, and recording medium disposed on said substrate, said substrate is composed of a glass containing $SiO_2$ in the range of 51 to 71% by weight, $Na_2O$ in the range of 10 to 18% by weight, $K_2O$ in the range of 0 to 8% by weight, $Al_2O_3$ in the range of 12 to 22% by weight, and $B_2O_3$ in the range of 0 to 9% by weight.

2. An optical memory element according to claim 1, wherein said grooves are formed by disposing a photo-resist film on said glass substrate; disposing a masking board, on which groove information is patterned, on said photo-resist film; applying light to said masking board to form a guide groove pattern latent image on said photo-resist film; developing said guide groove pattern latent image formed on said photoresist film to form the grooves in the photo-resist film; subjecting said glass substrate covered with said photo-resist film containing the grooves to an etching treatment to form the grooves in said glass substrate; and removing said photo-resist film from said glass substrate.

3. An optical memory element according to claim 2, wherein said etching treatment is conducted by either a dry etching technique or a wet etching technique.

4. In an optical memory element comprising a substrate with grooves from which signals are read out, the element wherein said substrate is composed of a glass comprising:

$SiO_2$ in the range of 51 to 71% by weight, $Na_2O$ in the range of 10 to 18% by weight, $K_2O$ in the range of 0 to 8% by weight, $Al_2O_3$ in the range of 12 to 22% by weight, and $B_2O_3$ in the range of 0 to 9% by weight.

5. An optical memory element according to claim 4, wherein said grooves are formed by:

disposing a photo-resist film on said glass substrate;

disposing a masking board, on which groove information is patterned, on said photo-resist film;

applying light to said masking board to form a guide groove pattern latent image on said photo-resist film;

developing said guide groove pattern latent image formed on said photo-resist film to form the grooves in the photo-resist film;

subjecting said glass substrate covered with said photo-resist film containing the grooves to an etching treatment to form the grooves in said glass substrate; and removing said photo-resist film from said glass substrate.

6. An optical memory element according to claim 5 wherein said etching treatment is conducted by a technique selected from dry etching and wet etching.

* * * * *